United States Patent [19]

Steidel

[11] 3,784,951

[45] Jan. 8, 1974

[54] THIN FILM RESISTORS

[75] Inventor: Charles A. Steidel, Plainfield, N.J.

[73] Assignee: Bell Telephone Laboratories, Incorporated, Murray Hill, N.J.

[22] Filed: Dec. 16, 1970

[21] Appl. No.: 98,723

Related U.S. Application Data

[62] Division of Ser. No. 731,183, May 22, 1968, Pat. No. 3,627,577.

[52] U.S. Cl. ................ 338/262, 117/217, 204/38 A, 338/308

[51] Int. Cl. ................ H01c 7/00

[58] Field of Search ................ 338/262, 308; 204/192, 15, 38 A; 117/217

[56] References Cited

UNITED STATES PATENTS

| | | | |
|---|---|---|---|
| 3,261,082 | 7/1966 | Maissel | 204/38 A |
| 3,368,919 | 2/1968 | Casale | 117/217 |
| 3,443,311 | 5/1969 | Worobey | 117/217 UX |

FOREIGN PATENTS OR APPLICATIONS

| | | | |
|---|---|---|---|
| 1,067,831 | 5/1967 | Great Britain | 204/192 |

*Primary Examiner*—E. A. Goldberg
*Attorney*—E. M. Fink

[57] ABSTRACT

Thin film resistors may be obtained by depositing tantalum-aluminum films containing from 25–60 atom per cent aluminum upon an insulating substrate member by conventional condensation techniques and on anodizing the deposited film.

1 Claim, 6 Drawing Figures

PATENTED JAN 8 1974 3,784,951

INVENTOR
C. A. STEIDEL
BY
ATTORNEY

THIN FILM RESISTORS

This is a division of copending application Ser. No. 731,183, filed May 22, 1968, now U.S. Pat. No. 3,627,577, issued Dec. 14, 1971.

This invention relates to a technique for the fabrication of thin film components and to the resultant devices. More particularly, the present invention relates to a technique for the fabrication of thin film components including a condensed film of a tantalum-aluminum alloy, such components being of particular interest for use as resistors.

Miniaturization of components and circuitry coupled with the increasing complexity of modern electronic systems have created an unprecedented demand for reliability in thin film components. Furthermore, the extraordinary terrestrial and interplanetary environments created by the space age have further increased the severity of the problems associated with component reliability. Heretofore, most of the requirements of stability, precision and miniaturization have been fulfilled simultaneously by the use of tantalum components wherein elemental tantalum or a compound thereof has been utilized in the form of a thin film. Despite continued investigation, workers in the art have failed to develop any material which has been able to compete with tantalum or compounds thereof from the standpoint of quality.

In accordance with the present invention, this end is attained by the use of tantalum-aluminum alloys in condensed form as the thin film material in the components of interest. Resistive devices fabricated in accordance with the described technique have been found to evidence an unusually high degree of stability and have proven to be superior to tantalum-nitride structures.

Briefly, the inventive technique involves depositing a thin layer of a tantalum-aluminum alloy containing from 25 – 60 atom per cent aluminum upon a suitable substrate member by condensation techniques and the subsequent generation of a desired resistive device by conventional procedures.

Figure 1:
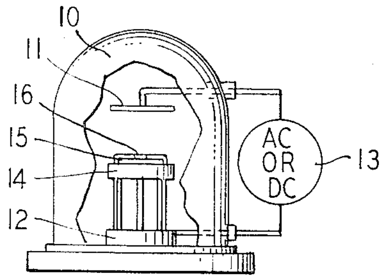

The invention will be more readily understood by reference to the following detailed description taken in conjunction with the accompanying drawing, wherein:

FIG. 1 is a schematic front elevational view of an apparatus suitable for use in producing a film of a tantalum-aluminum alloy by cathodic sputtering in accordance with the present invention; and FIGS. 2A through 2E are plan views of a resistor produced in accordance with the present invention in successive stages of fabrication.

With further reference now to FIG. 1, there is shown a suitable apparatus for use in the deposition of a tantalum-aluminum film by cathodic sputtering. Shown in the figure is a vacuum chamber 10 in which are disposed cathode 11 and anode 12. Cathode 11 may be a tantalum-aluminum alloy, a tantalum disk partially covered with aluminum or a tantalum disk bearing machined stripes of aluminum. In each case, the cathode configuration is so constructed as to yield a tantalum-aluminum film containing from 25 – 60 atom per cent aluminum. This end may be attained by utilizing a tantalum-aluminum cathode containing from 25 – 60 atom per cent aluminum or, in the latter two cases, alluded to above, by constructing the disk in such manner that the geometrical area of aluminum bears the same ratio to the geometrical area of tantalum as the atom per cent aluminum does to the atom per cent tantalum in the resultant film.

A source of electrical potential 13 is shown connected between cathode 11 and anode 12. Platform 14 is employed as a positioning support for substrate 15 upon which the sputtered film is to be deposited. Mask 16 is placed upon substrate 15 to restrict the deposition to the desired area.

Figure 2A:
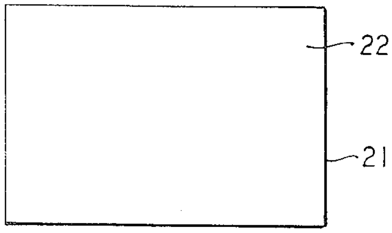

FIGS. 2A through 2E are plan views of a resistor produced in accordance with the present invention. FIG. 2A shows substrate 21 upon which a film of tantalum-aluminum alloy 22 has been deposited. In accordance with the invention, film 22 may be produced by a condensation technique such as cathodic sputtering or vacuum evaporation.

Figure 2B:
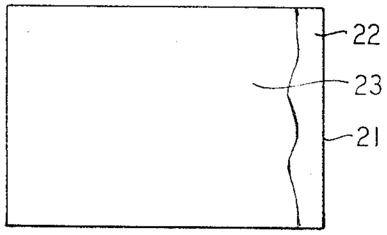
Figure 2C:
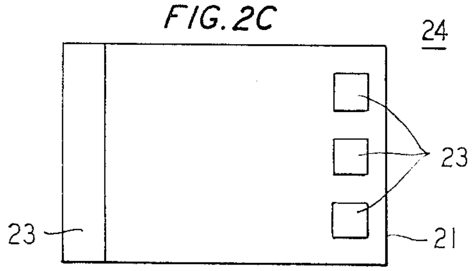
Figure 2D:
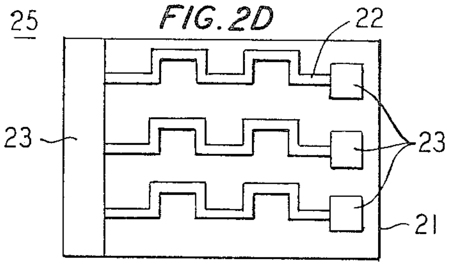
Figure 2E:
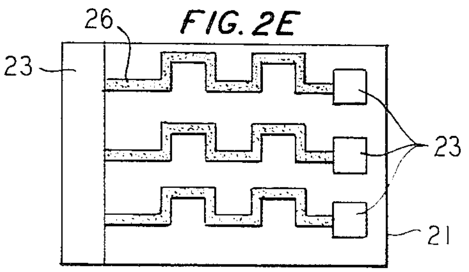

The tantalum-aluminum alloy layer 22 may typically be coated with a conductor 23, for example, Nichrome-gold, to produce the body shown in FIG. 2B. Thereafter, a suitable conductor pattern 24 is generated upon the structure by photoengraving techniques, as shown in FIG. 2C. Next, the resultant assembly is further photoengraved to form a resistor pattern 25 (FIG. 2D). The tantalum-aluminum alloy layer 22 is next immersed in an anodizing electrolyte and made positive with respect to another electrode immersed in the electrolyte, so yielding an oxide film 26, shown in FIG. 2E. The devices so obtained may then be trim anodized in the manner described in U. S. Pat. No. 3,148,129, issued Sept. 8, 1964, and/or thermally pre-aged in the manner described in U. S. Pat. No. 3,159,556, issued Dec. 1, 1964.

As disclosed, the inventive process contemplates the use of a substrate upon which the capacitor is produced. Suitable substrate materials are those which conform to the requirements imposed by the various process steps. It is preferred that the substrate be possessed of a smooth surface which is completely free from sharp changes in contour and should be a material which is able to withstand temperatures as high as 300° – 400° C. since it may be heated to temperatures in this range during the deposition. All types of refractory materials such as glass, ceramics, and high melting materials meet these requirements. The use of external cooling means, however, permits the use of other materials.

The present invention may conveniently be described in detail by reference to an illustrative example wherein a tantalum-aluminum alloy is deposited upon a substrate by cathodic sputtering in an apparatus similar to that shown in FIG. 1.

A substrate 15 is first vigorously cleaned. Conventional cleaning agents are suitable, the choice of a particular agent being dependent upon the composition of the substrate itself. Substrate 15 is placed upon the platform 14 as shown in FIG. 1 and mask 16 is then suitably positioned. Platform 14 and mask 16 may be fabricated from any refractory material. However, it may be convenient to use a metal for ease in fabricating mask 16. The cathode employed in the practice of the present invention may be a tantalum-aluminum alloy containing from 25 – 60 atom per cent aluminum or a composite tantalum-aluminum cathode that is constructed so that the desired geometric ratio of the aluminum-to-tantalum over the entire area ranges from 25 – 60 per cent. It has been found that the geometric area of aluminum in the composite structure corresponds approximately with the atom per cent aluminum in the deposited film. Deposited films containing less than 25 atom per cent aluminum are found to be of poor stability, whereas deposited films containing greater than 60 atom per cent aluminum may evidence galvanic corrosion under high humidity conditions. Accordingly, the range of interest is from 25 – 60 atom per cent aluminum, a preferred range being from 25 to 45 atom per cent aluminum. An optimum has been found to correspond with a composition containing 30 atom per cent aluminum.

The conditions used in cathodic sputtering as employed in this invention are known (see vacuum deposition of thin films, L. Holland, J. Wiley & Sons, New York 1956). In accordance with this process, the vacuum chamber is first evacuated, flushed with an inert gas, as for example, any of the members of the rare gas family such as helium, argon, or neon, and the chamber re-evacuated. The extent of the vacuum required is dependent upon consideration of several factors.

Increasing the inert gas pressure and thereby reducing the vacuum within chamber 10 increases the rate at which the metal being sputtered is removed from the cathode and, accordingly, increases the rate of deposition. The maximum pressure is usually dictated by power supply limitations since increasing the pressure also increases the current flow between anode 12 and cathode 11. A practical upper limit in tnis respect is 150 microns of mercury for a sputtering voltage of the order of 5,000 volts. The ultimate maximum pressure is that at which the sputtering can be reasonably controlled within the prescribed tolerances. It follows from the discussion above that the minimum pressure is determined by the lowest deposition rate which can be economically tolerated. After the requisite pressure is obtained, cathode 11 is made electrically negative with respect to anode 12.

The voltage necessary to produce a sputtered layer of tantalum-aluminum alloy suitable for the purpose of this invention may range from as low as 1,000 to 6,500 volts d-c. Increasing the potential difference between anode 12 and cathode 11 has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations occur in the glow discharge produced during sputtering. Some of these striations are well known and have been given names as, for example, Crooke's Dark Space. For the best efficiency during the sputtering step, substrate 15 should be positioned immediately without the Crooke's Dark Space on the side closest to the anode 12. Location of substrate 15 closer to the cathode 11 results in a metal deposit of poorer quality. Locating substrate 15 further from cathode 11 results in the impingement on the substrate by a smaller fraction of the total metal sputtered, thereby increasing the time necessary to produce a deposit of a given thickness.

It must be noted that the location of Crooke's Dark Space changes with variations in the pressure, it moving closer to the cathode with increasing pressure. As the substrate is moved closer to the cathode, it tends to act as an obstacle in the path of gas ions which are bombarding the cathode.

Accordingly, the pressure should be maintained sufficiently low so that Crooke's Dark Space is located beyond the point at which a substrate would cause shielding of the cathode.

The balancing of these various factors of voltage, pressure, and relative positions of the cathode, anode, and substrate to obtain a high quality deposit is well known in the sputtering art.

With reference now more particularly to the example under discussion, by employing a proper voltage, pressure, and spacing of the various elements within the vacuum chamber, a layer of a tantalum-aluminum alloy is deposited in a configuration determined by mask 16. The sputtering is conducted for a period of time calculated to produce the desired thickness.

For the purposes of this invention, the configuration and thickness of the deposited film are determined by the ultimate value of resistance desired. The initial thickness of the deposited film is preferably above 400 A. This value is based upon two factors; first the alloy thickness subsequent to anodization is preferably greater than 300 A to insure continuity, and second conversion of at least 100 A to the oxide form is preferable from the standpoint of ease of operation. There is no upper limit of initial film thickness dictated by the described procedure, any film thickness which conforms to the desired ultimate resistance value being suitable. For practical purposes, it has been determined that 4,000 A is suitable, although thicknesses as great as 25,000 A are within the realm of the invention.

Following the sputtering step, the tantalum-aluminum alloy layer may be anodized in an appropriate electrolyte, the anodizing procedure being governed by all factors generally encountered in conventional anodization procedures. Any of the customary electrolytes such as dilute nitric acid, boric acid, acetic acid, citric acid, tartaric acid, and so forth, may be chosen as long as they are compatible with the alloy being anodized and dependent upon the ultimate use of the structure. The usual procedure followed is similar to conventional anodizing processes in which a low voltage is applied initially and the voltage increased so as to maintain a constant anodizing current.

In the fabrication of resistors in accordance with the invention, anodization may be continued until a desired value of resistance is attained, as indicated by a monitoring means, and the resultant structure may then be thermally pre-aged in the manner described in U. S. Pat. No. 3,159,556 or treated in any manner consistent with its ultimate use.

In the claims appended to this disclosure, the term "condensation" is used to describe the method by which the tantalum-aluminum alloy layer is produced upon the substrate. In the sense that "condensation" is descriptive of the formation of a more compact mass, this word is intended to include the formation of the metal layer by either cathodic sputtering or vacuum evaporation techniques.

An example of the present invention is described in detail below. The example and the illustration described above are included merely to aid in the understanding of the invention, and variations may be made by one skilled in the art without departing from the spirit and scope of the invention.

Example

This example describes the fabrication of a resistor in accordance with the invention.

A cathodic sputtering apparatus similar to that shown in FIG. 1 was used to produce a tantalum-aluminum film. In the apparatus actually employed, the anode was floating, the potential difference being obtained by making the cathode negative with respect to ground.

A glass microscope slide was used as the substrate. The slide was boiled in aqua regia, rinsed in distilled water, and flame dried to produce a clean surface. The tantalum, which was of commercial grade, was employed in the form of a disk, 4 inches in diameter having an annular piece of sheet aluminum (99.5 percent pure) affixed thereto in such manner that the aluminum covered 25 per cent of the geometric area of the tantalum disk.

The vacuum chamber was initially evacuated to a pressure of the order of $1 \times 10^{-6}$ torr., and argon admitted thereto at a pressure of 25 microns of mercury. The anode and cathode were spaced approximately 2.5 inches apart, the masked substrate being placed therebetween at a position immediately outside Crooke's Dark Space. A d-c voltage of approximately 4,000 volts was impressed between the cathode and anode and sputtering conducted for 8 minutes, so yielding a layer of a tantalum-aluminum alloy (containing approximately 25 atom per cent aluminum) 1,000 A in thickness.

The sputtered tantalum-aluminum alloy was next coated with a 200 A thick layer of Nichrome and a 4,000 A thick layer of gold by conventional vacuum evaporation techniques. Thereafter, a conductor pattern was generated in the Nichrome-gold layer by conventional photoengraving techniques utilizing an iodine-iodide etchant. The Nichrome was removed with hydrochloric acid. Following, a meandering pattern of 13 resistors was generated in the structure by conventional photoengraving techniques utilizing an etchant comprising a 1:1:1 mixture of water, hydrofluoric acid, and nitric acid.

Thereafter, a grease mask was applied by a standard techniques to the conductor areas, and the resultant assembly dipped into a 0.01 per cent citric acid electrolyte and anodized to 40 volts for 30 minutes. Then, the grease was removed from the anodized assembly and the structure heated at 250° C. for 5 hours in air. Finally, the resistors were trimmed to value by standard trim anodization techniques.

The resultant resistor assembly was then separated into individual resistors and terminations applied thereto by solder dipping techniques. Next, they were load tested at 1.3 watts. After 1 week, the average resistance was found to vary by approximately 0.1 per cent. For comparative purposes, a group of tantalum nitride resistors prepared in accordance with the procedure described in U. S. Pat. No. 3,242,006 were evaluated. After load testing at 1.3 watts, the resistance of the tantalum-nitride resistors was found to vary by approximately 2 – 3 per cent.

While the invention has been described in detail in the foregoing specification and the drawing similarly illustrates the same, the aforesaid is by way of illustration only and is not restrictive in character. The several modifications which will readily describe themselves to persons skilled in the art are all considered within the broad scope of the present invention, reference being had to the appended claims.

What is claimed is:

1. A stable metal film resistor including successively a non-conducting substrate and a thin film consisting essentially of an anodized tantalum-aluminum alloy consisting of from 25–60 atom percent aluminum.

* * * * *